(12) United States Patent
Batra et al.

(10) Patent No.: US 9,542,469 B2
(45) Date of Patent: Jan. 10, 2017

(54) DATA WAREHOUSE DATA MODEL ADAPTERS

(75) Inventors: Vishal Singh Batra, Noida (IN); Manish Anand Bhide, New Delhi (IN); Mukesh Kumar Mohania, Rajpur Chung (IN); Sumit Negi, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1223 days.

(21) Appl. No.: 12/868,363

(22) Filed: Aug. 25, 2010

(65) Prior Publication Data

US 2012/0054249 A1 Mar. 1, 2012

(51) Int. Cl.
*G06F 17/30* (2006.01)

(52) U.S. Cl.
CPC .............. *G06F 17/30592* (2013.01)

(58) Field of Classification Search
CPC .............................................. G06F 17/30592
USPC ......................................... 707/999.102, 803
See application file for complete search history.

(56) References Cited

U.S. PATENT DOCUMENTS

| | | | |
|---|---|---|---|
| 6,161,103 A * | 12/2000 | Rauer | G06Q 30/02 |
| 6,438,538 B1 * | 8/2002 | Goldring | G06F 17/30463 |
| 7,139,779 B1 | 11/2006 | Kornelson et al. | |
| 7,280,998 B1 | 10/2007 | Aboujoude et al. | |
| 7,895,191 B2 * | 2/2011 | Colossi | G06F 17/30312 |
| | | | 707/600 |
| 2002/0095399 A1 * | 7/2002 | Devine | G06F 17/3089 |
| 2002/0133368 A1 * | 9/2002 | Strutt | G06F 17/30592 |
| | | | 705/7.11 |
| 2004/0193575 A1 * | 9/2004 | Chen | G06F 17/30607 |
| 2005/0015377 A1 * | 1/2005 | Wan | G06F 17/30557 |
| 2005/0246357 A1 * | 11/2005 | Geary | G06F 17/30592 |
| 2006/0184464 A1 * | 8/2006 | Tseng | G06F 17/30616 |
| | | | 706/14 |

(Continued)

FOREIGN PATENT DOCUMENTS

EP 2079020 7/2009

OTHER PUBLICATIONS

Chaudhuri et al., "An Overview of Data Warehousing and OLAP Technology", ACM SIGMOD Record, vol. 26, Issue 1, Mar. 1997, pp. 65-74 (10 pages).*

(Continued)

*Primary Examiner* — Phuong Thao Cao
(74) *Attorney, Agent, or Firm* — Ference & Associates LLC

(57) ABSTRACT

In the context of data administration in enterprises, an effective manner of providing a central data warehouse, particularly via employing a tool that helps by analyzing existing data and reports from different business units. In accordance with at least one embodiment of the invention, such a tool analyzes the data model of an enterprise and proposes alternatives for building a new data warehouse. The tool, in accordance with at least one embodiment of the invention, models the problem of identifying fact/dimension attributes of a warehouse model as a graph cut on a Dependency Analysis Graph (DAG). The DAG is built using existing data models and the report generation scripts. The tool also uses the DAG for generation of ETL (Extract, Transform Load) scripts that can be used to populate the newly proposed data warehouse from data present in the existing schemas.

23 Claims, 7 Drawing Sheets

(56) References Cited

U.S. PATENT DOCUMENTS

| | | | |
|---|---|---|---|
| 2007/0136323 A1* | 6/2007 | Zurek | G06F 17/30592 |
| 2007/0203933 A1* | 8/2007 | Iversen | G06F 17/30592 |
| 2008/0097816 A1* | 4/2008 | Freire | G06Q 10/063 |
| | | | 705/7.26 |
| 2008/0195430 A1 | 8/2008 | Rustagi | |
| 2008/0307386 A1* | 12/2008 | Chen | G06F 11/1471 |
| | | | 717/109 |
| 2009/0006146 A1* | 1/2009 | Chowdhary | G06F 17/30572 |
| | | | 705/7.11 |
| 2009/0177671 A1 | 7/2009 | Pellegrini | |
| 2009/0271762 A1* | 10/2009 | Taylor | G06F 21/6227 |
| | | | 717/107 |
| 2009/0299987 A1 | 12/2009 | Willson | |
| 2010/0070421 A1 | 3/2010 | Fazal et al. | |
| 2010/0070461 A1* | 3/2010 | Vella | G06F 17/30418 |
| | | | 707/603 |
| 2012/0054249 A1* | 3/2012 | Batra | G06F 17/30592 |
| | | | 707/803 |

OTHER PUBLICATIONS

Negi et al., "D'Mart: A Tool for Building and Populating Data Warehouse Model from Existing Reports and Tables", H. Gao et al. (Eds.): WAIM 2012, LNCS 7418, pp. 102-113, 2012.*
ETL Development—Integration Services for Enterprise Data, available at URL: http://www.listertechnologies.com/reporting/etl.html.
Oracle Data Warehouse Development Best Practices, available at URL: http://www.dba-oracle.com/t_data_warehouse_development_best_practices.htm.
Deliver an Effective and Flexible Data Warehouse Solution, Part 3: Design and Implement a Warehouse ETL Process, available at URL: http:www.ibm.com/developerworks/data/library/techarticle/dm-0508gong/.
A Data Warehouse Modeling Solution, available at URL: http://www.pervasiveintegration.com/scenarios/Pages/data_warehouse.aspx.

* cited by examiner

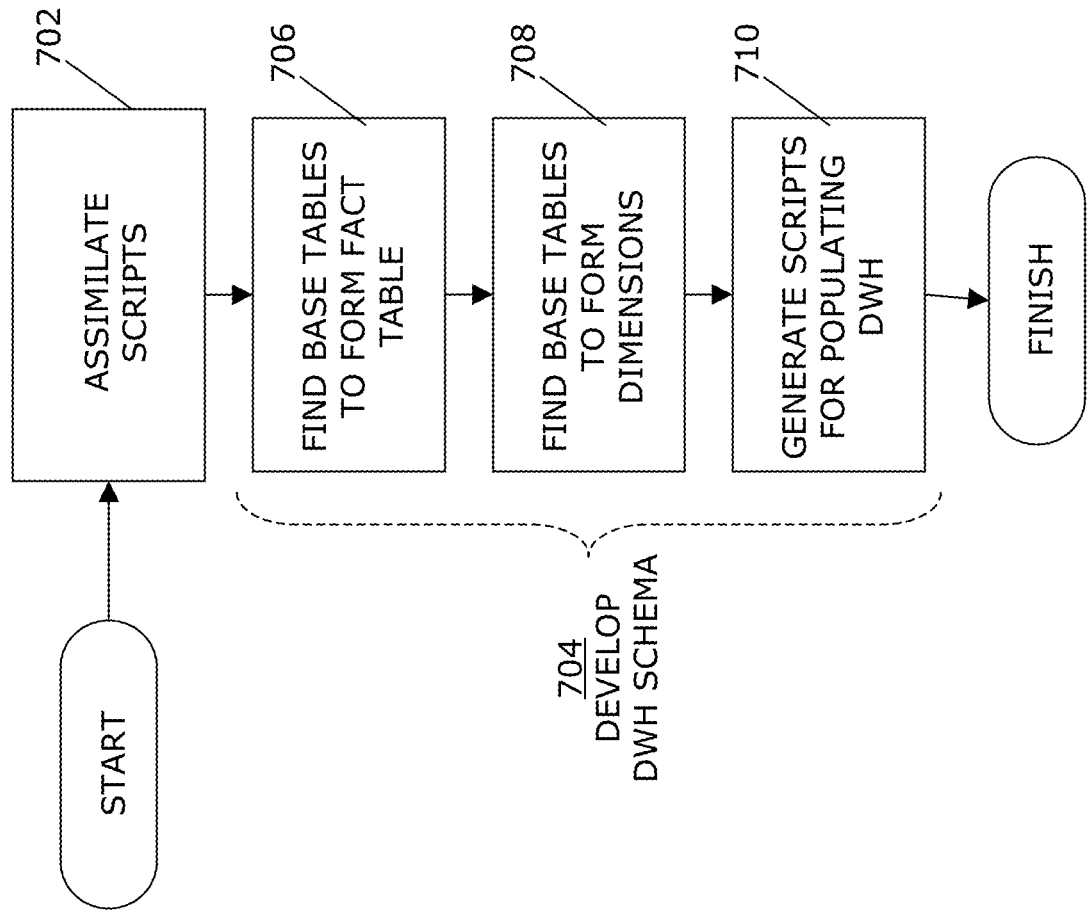

DATA WAREHOUSE DATA MODEL ADAPTERS

BACKGROUND

As companies grow (organically or inorganically), data administration becomes the next logical step in their IT evolution. To organize data and infrastructure, the enterprises are often faced with the requirement to consolidate multiple in-house data sets catering to individual business units into one consistent warehouse data model. This is not an easy task especially when time is of the essence. This problem is further exacerbated where large enterprises have multiple business units as an outcome of mergers, acquisitions or by having to respond to urgent operational needs by creating new departments and teams. In such a setting, consolidating data across different business units requires significant time and effort in studying the data and reporting requirements of each unit manually and based on that design the consolidated data model for the data warehouse that can facilitate the existing new reporting requirements of the business units. Therefore, designing a central data warehouse for such enterprises becomes a daunting task.

BRIEF SUMMARY

In summary, one aspect of the invention provides a method comprising: assimilating scripts which generate reports, the scripts relating to preexisting base tables; and developing a schema for a new data warehouse, the developing comprising: finding base tables to form a fact table in the new data warehouse; finding base tables to form dimensions in the new data warehouse; and generating scripts for populating the new data warehouse.

Another aspect of the invention provides an apparatus comprising: one or more processors; and a computer readable storage medium having computer readable program code embodied therewith and executable by the one or more processors, the computer readable program code comprising: computer readable program code configured to assimilate scripts which generate reports, the scripts relating to preexisting base tables; and computer readable program code configured to develop a schema for a new data warehouse via: finding base tables to form a fact table in the new data warehouse; finding base tables to form dimensions in the new data warehouse; and generating scripts for populating the new data warehouse.

An additional aspect of the invention provides a computer program product comprising: a computer readable storage medium having computer readable program code embodied therewith, the computer readable program code comprising: computer readable program code configured to assimilate scripts which generate reports, the scripts relating to preexisting base tables; and computer readable program code configured to develop a schema for a new data warehouse via: finding base tables to form a fact table in the new data warehouse; finding base tables to form dimensions in the new data warehouse; and generating scripts for populating the new data warehouse.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 7 sets forth a process more generally for data warehouse data model adaptation.

DETAILED DESCRIPTION

Figure 1:
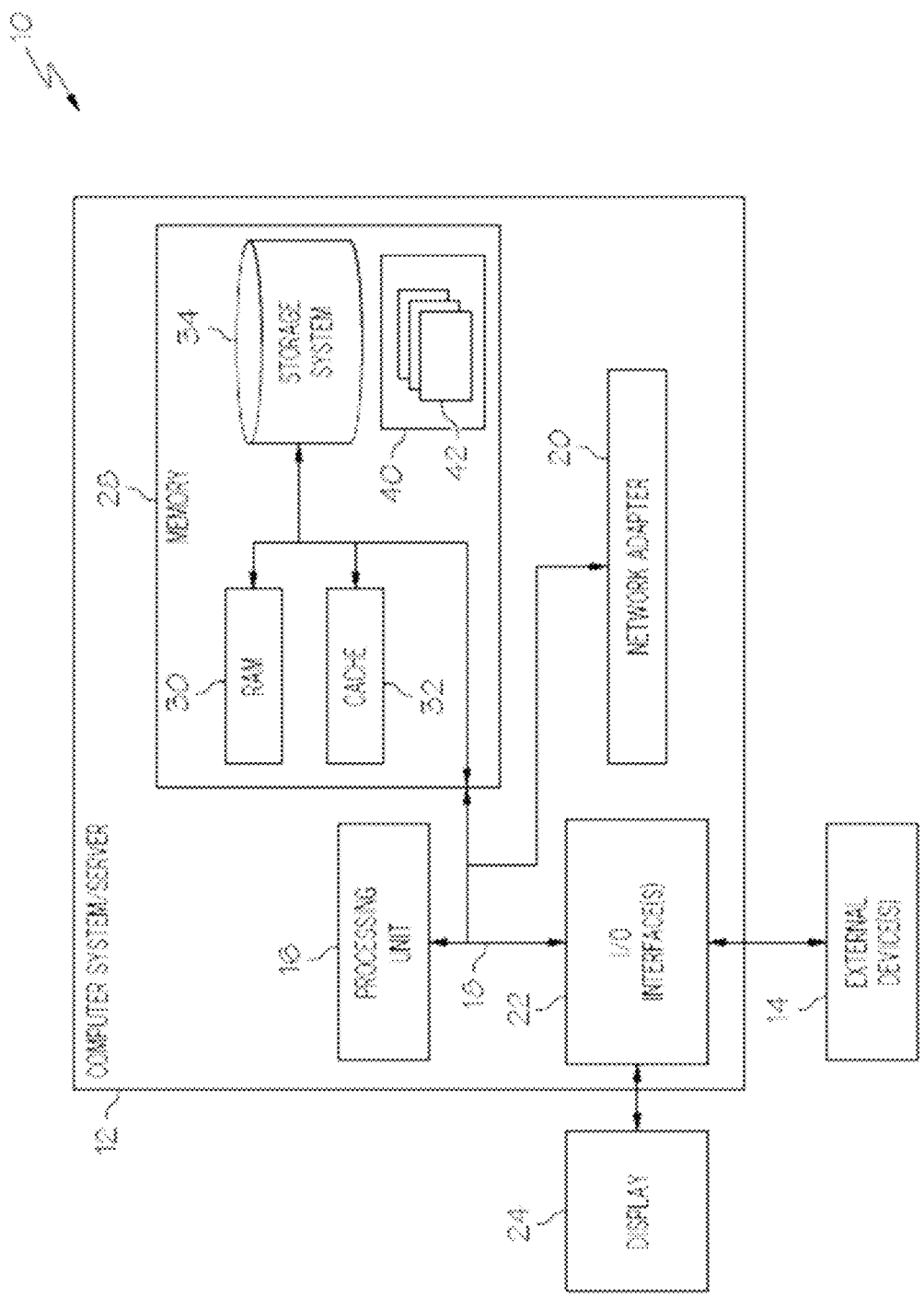
FIG. 1 illustrates a computer system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The disclosure now turns to FIGS. 2-6. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 1. In accordance with an example embodiment, most if not all of the process steps, components and outputs discussed with respect to FIGS. 2-6 can be performed or utilized by way of a processing unit or units and system memory such as those indicated, respectively, at 16 and 28 in FIG. 1, whether on a server computer, a client computer, a node computer in a distributed network, or any combination thereof.

Broadly contemplated herein, in accordance with at least one embodiment of the invention, is an effective manner of providing a central data warehouse, particularly via employing a tool that helps by analyzing existing data and reports from different business units.

In accordance with at least one embodiment of the invention, such a tool analyzes the data model of an enterprise and proposes alternatives for building a new data warehouse. The tool, in accordance with at least one embodiment of the invention, models the problem of identifying fact/dimension attributes of a warehouse model as a graph cut on a Dependency Analysis Graph (DAG). The DAG is built using existing data models and the report generation scripts. The tool also uses the DAG for generation of ETL (Extract, Transform Load) scripts that can be used to populate the newly proposed data warehouse from data present in the existing schemas.

Generally, implementing a data warehouse solution is a challenging and time consuming process. Some particular challenges can be noted in building a data warehouse. For example, most warehousing projects begin by understanding how data is currently managed and consumed in the organization. Even though most of this knowledge exists in the IT systems that are in place, there is a limited capability to extract this information from these systems. For instance, conventional data models and target reports normally have to be manually scanned to create a "data-inventory". This can be a very time consuming process.

Further, the development of the ETL scripts (which populate the existing tables in the organization) is typically delegated to external consultants or vendors in conventional arrangements. Hence, there is normally a need to acquire domain knowledge and requirements so as to develop the ETL flows for the new data warehouse. This can be a very cumbersome task.

In addition, the problem just mentioned can be exacerbated by the fact that the vocabulary could be inconsistent across the two merging entities (e.g., departments) thereby leading to errors in the newly generated ETL workflows.

One option that has been used by enterprises in such environments is to use an established pre-built domain dependent warehouse data model and move all the data from different Lines of Business (LOB) to this new data model. However, using such a pre-defined data model does not avoid any of the problems mentioned above. Furthermore, a primary demand found among of customers is a desire to ensure that all BI (business intelligence) reports that were running on existing data model be rebuilt and reengineered to run on a new data model.

In accordance with at least one embodiment of the invention, there is provided an automated approach that utilizes the information present in existing data sets and reports to recommend an "optimal" and "sufficient" data warehouse model and ETL scripts.

A tool, in accordance with at least one embodiment of the invention, analyzes an existing data model and report generation scripts. It then uses such information to afford several functions now to be noted.

Generally, in accordance with at least one embodiment of the invention, a tool provides a new data warehouse schema such that it can reuse as much as possible of the original schema of the merging entities. It also is configured for identifying shared dimensions and possible hierarchies in the dimensions.

In accordance with at least one embodiment of the invention, the tool finds the common data and report entities across business units which may have different names but similar or the same content. These data elements are candidates for merging in the new data warehouse to avoid any duplicate/redundant data in the data warehouse.

In accordance with at least one embodiment of the invention, the tool ensures that the data characteristics of the newly proposed data warehouse adheres to various design principles such as dimensions being in second normal form and fact tables being in third normal form. (See Codd, infra.)

In accordance with at least one embodiment of the invention, the tool generates a skeleton of the ETL scripts for populating the data from the base tables directly to the new data warehouse.

In accordance with at least one embodiment of the invention, the tool also suggests ways for generating/rewriting the reports using the new data warehouse. As the new data warehouse is built by "adapting" the existing data model, writing scripts for generating the reports is relatively less complex.

Thus, a clear advantage of a tool in accordance with at least one embodiment of the invention is that it tries to retain the characteristics of the existing data model and reports as far as possible. This ensures that the amount of effort needed to build and migrate to the new data warehouse/mart is kept to a minimum.

Generally, conventional data warehouse development processes can be broadly categorized into three basic groups: data driven, goal driven and user driven. These development methodologies differ on the basic approach employed (e.g., top down/bottom up), extent of end user involvement, duration of development and completion, skill level of data warehouse designer, complexity of data model, etc.

In a data-driven methodology, the idea is promoted data warehouse environments are data driven, in comparison to other conventional systems, which have a requirement-driven development life cycle. As per this approach, BI requirements are the last thing to be considered in the decision support development life cycle, in that they are only understood after the data warehouse has been populated with data and results of queries have been analyzed by users. This data warehouse development strategy is based on the analysis of the corporate data model and relevant transactions and ignores the needs of data warehouse users a priori. Company goals and user requirements are not reflected at all.

In a goal-driven methodology, or business model-driven data warehousing methodology, is based on the SOM (Semantic Object Model) process modeling technique. The first stage of the development cycle determines goals and services the company provides to its customers. Then the business process is analyzed by applying the SOM interaction schema. This stage highlights the customers and their transactions with the process under study. In the third step, sequences of transactions are transformed into sequences of existing dependencies that refer to information systems. The last step identifies measures and dimensions.

Finally, a user-driven methodology is based on the BI needs. Essentially, BI users here define goals and priorities, as well as define business questions supporting these goals. Afterwards, the business questions are prioritized and the most important business questions are defined in terms of data elements, including the definition of hierarchies, dimensions.

In accordance with at least one embodiment of the invention, a tool advantageously analyzes simultaneously the schema of the operational databases (bottom up) and the report reporting requirements (top down) to recommend a data warehouse model. This provides a depth and versatility not at all shared by the three conventional approaches discussed above.

Figure 2:
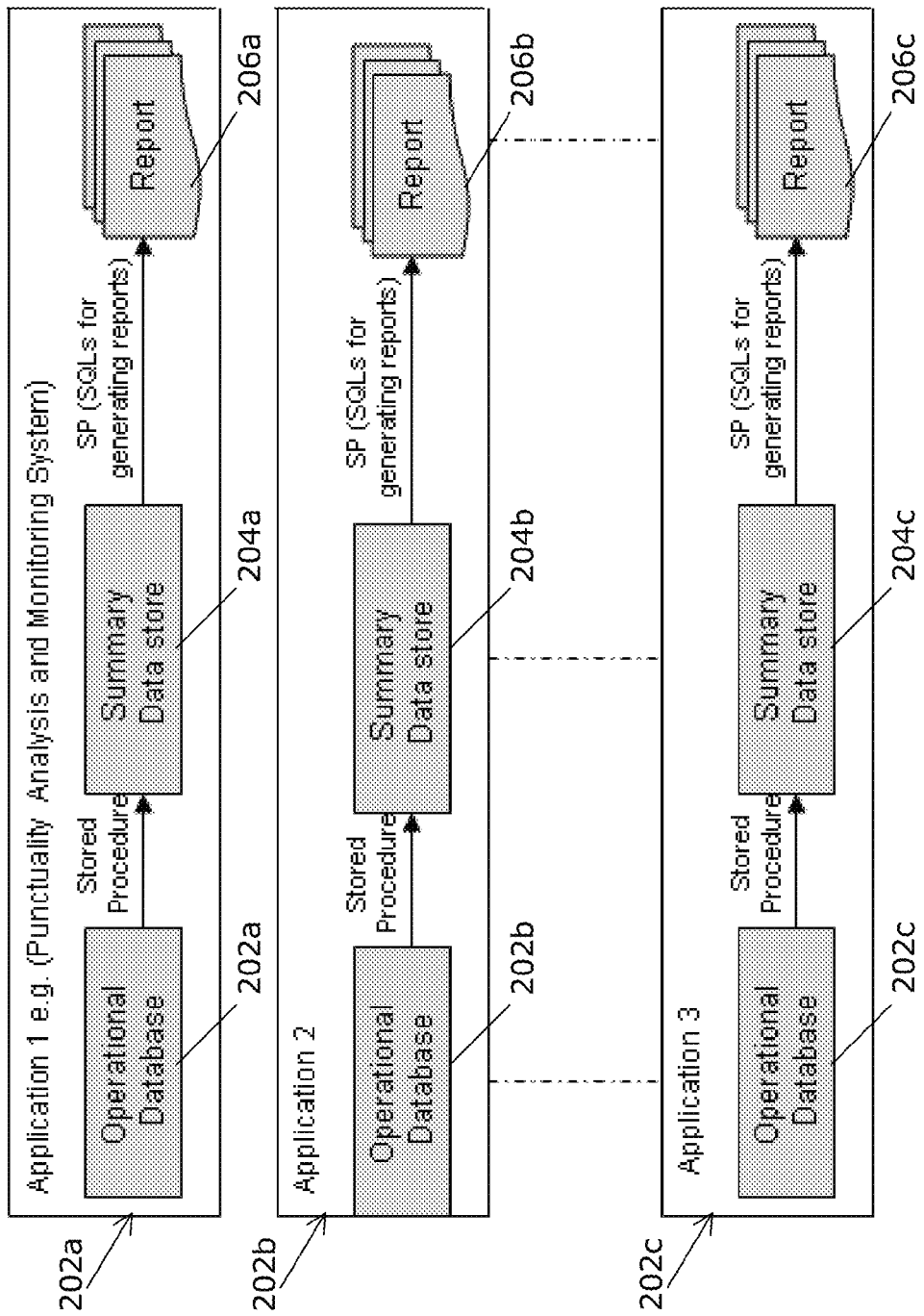
FIG. 2 schematically illustrates a conventional IT application setup.
Figure 3:
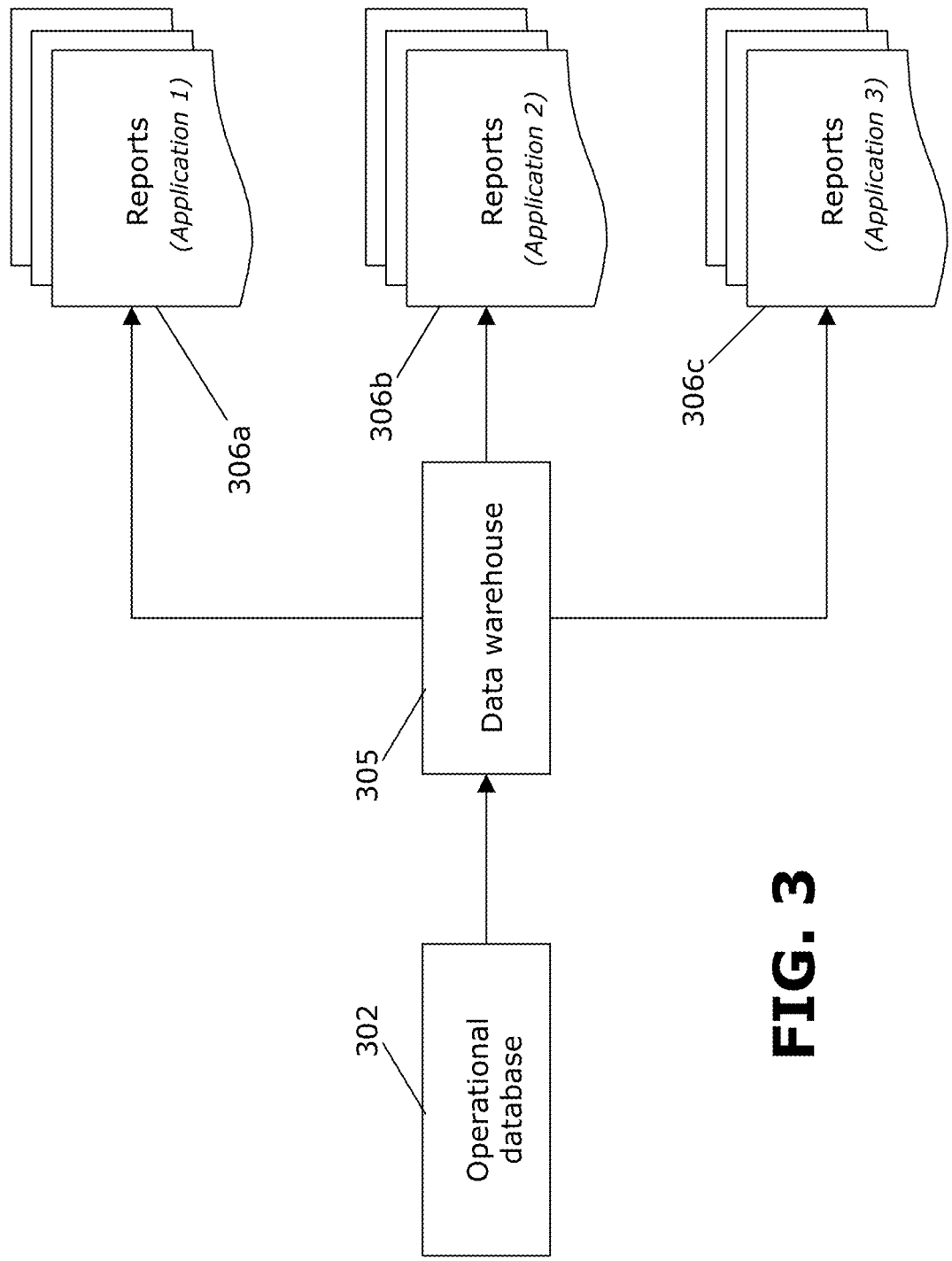
FIG. 3 schematically illustrates an IT application setup with a central data warehouse.

Embodiments of the present invention will now be better appreciated with a working example, involving a large railway company. This is presented merely by way of an illustrative and non-restrictive example, and effectively demonstrates advantages that can be provided by a tool according to at least one embodiment of the invention. FIG. 2 shows a setup in such a context on conventional lines, while FIG. 3 shows a target setup, in accordance with at least one embodiment of the invention, with a central DWH for all business units. Reference can continue to be made to both figures.

As such, the IT application landscape at a large railway company, and a targeted resolution in accordance with at least one embodiment of the invention, may be considered as follows. In the illustrative and non-restrictive example of a large railway company, three applications 202a/b/c, in the form of punctuality analysis and monitoring systems, may be considered for illustrative purposes, as shown in FIG. 2. Each application has its own corresponding operational data store 204a/b/c and an off-line data summary store 206a/b/c. Periodically, data is moved from each application's operational data store 204a/b/c to its corresponding off-line data summary store 206a/b/c. This is done using a set of complex stored procedures that read data from each operational data source 204a/b/c perform the required summarization and copy the data to the corresponding off-line data summary store 206a/b/c. Reports 208a/b/c are correspondingly generated from the database of each off-line data summary store 206a/b/c. As each of the applications 202a/b/c may typically have been developed at different points in time, each application 202a/b/c can reasonably be expected to use a separate and isolated data model and vocabulary that is unique to itself.

The present illustrative and non-restrictive example considers that there is no data warehouse in place at the railway company, and that summary tables do not adhere to the norms and design principles that are typically expected to be adhered to by a data warehouse. As a result of this, a lot of effort is involved in generating new reports or making minor changes to existing reports. Even a small change in a report requires a change in the schema of the summary tables, which involves significant effort. Moreover, the present illustrative and non-restrictive example considers that scalability and performance issues are not adequately addressed.

A target setup, in accordance with at least one preferred embodiment of the present invention, is shown in FIG. 3. As shown, a single operational database 302 is in communication with a single data warehouse 305, which alone is capable of outputting reports 308a/b/c in accordance with three applications. Thus, the need for three separate operational databases and three separate summary data stores in the present example is obviated.

While in conventional setups the consolidation of data from each business unit to a central data warehouse, in the context of needing to support existing reporting needs, normally represents a difficult and daunting task, given that the existing data sets and reports of each LOB (line of business) is designed and deployed in isolation. In contrast, however, a tool in accordance with at least one embodiment of the invention helps to accelerate the design and development of a data warehouse schema in a setting such as a large railway company, from the data sets and reports of different LOB's. A tool in accordance with at least one embodiment of the invention also has a capability to merge different data marts to generate a single data warehouse.

A tool, in accordance with at least one embodiment of the invention, acts to find the schema of a new data warehouse. The tool ensures that minimal changes at best are made to an existing data model, and that the reports being generated in an existing data model are easily generated using the new data warehouse.

In accordance with at least one embodiment of the invention, a tool analyses the scripts used to generate the reports from the base tables and suggests the best possible schema for a data warehouse. In accordance with at least one embodiment of the invention, as shown schematically in FIG. 4, this process of suggesting the best possible schema includes: fact identification 402; dimension identification 404; push-down analysis 406; data analysis 408; and redundancy analysis 410.

In accordance with at least one embodiment of the invention, a first step of fact identification 402 involves finding a set of tables which will form a fact table in a new data warehouse. The dimension identification 404, on the other hand, involves finding a set tables which will form the dimensions. Push-down analysis 406 involves generating ETL scripts for populating the new data warehouse using an existing base table. Data analysis 408 ensures that the selected dimensions and facts adhere to standard design principles. Redundancy analysis 410 seeks to merge the similar attributes and tables from multiple base tables. Each of these individual steps are discussed in more detail hereBelow.

In accordance with at least one embodiment of the invention, fact identification 402 involves finding fact tables of the new data warehouse being set up. The following steps are involved: fact attribute identification; and affinity analysis.

In accordance with at least one embodiment of the invention, fact attribute identification involves scanning a report generation SQL to identify a set of attributes on which aggregate operation (such as sum, min, max, average, etc.) is defined. In addition to these attributes, attributes are also identified which are referred to directly in the reports. Such attributes can be of two types, wherein a first type of attribute (direct projection attribute) is that which is present in the outermost select clause of the report generation SQL, whereas the second type of attribute (indirect projection attribute) is one which is used in the inner query, but is projected out unchanged (possibly after being renamed) and used in the report.

In order to understand the use of an indirect projection attribute, consider a "delay report" in the context of the aforementioned example of a large railway company, wherein a list of delayed trains is displayed along with their delay (in minutes) during their last run, but only for those trains which were delayed more than 80% of the times in the last one month. Such a report, by way of example, can find the difference between the scheduled arrival time and actual arrival time for each train in the last one month and do a count to identify whether the train was delayed more than 80% of the times. It can then report the difference between the scheduled arrival time and actual arrival time during its last run. Thus, these two attributes can be considered indirect projection attributes. These indirect projection attributes will also have an aggregate operation defined on it (count), but it will not be used in the report. A sample SQL query used to generate such report is given below:

select name, DATEDIFF(minute, SCHEDULED_ARR, ACTUAL_ARR) as DELAY from (select name, SCHEDULED_ARR, ACTUAL_ARR from TRAIN_STATUS ii1 where SCHEDULED_ARR>=(select max(SCHEDULED_ARR) from TRAIN_STATUS ii2 where ii1.name=ii2.name) and DATEDIFF(minute, ii1.SCHEDULED_ARR, ii1.ACTUAL_ARR)<0 and ii1.name in (select name from (select name, count(*) as aa from TRAIN_STATUS where t1.late=1 group by name) t12 where t12.aa>(select 0.8*count(*) from TRAIN_STATUS t2 where t2.name=t12.name group by t2.name)))

In the aforementioned non-restrictive and illustrative example of a large railway company, it can be considered that there are very few direct projection attributes and a large number of indirect projection attributes. Finding an indirect projection attribute is a very challenging but important task. In the above query, the two attributes SCHEDULED_ARR and ACTUAL_ARR are used in multiple places. However, in accordance with at least one embodiment of the invention, a tool will mostly be concerned with those attributes which are projected out. Accordingly, in order to find the right attributes, the tool uses a graph-based representation system to address such a challenge.

Figure 5:
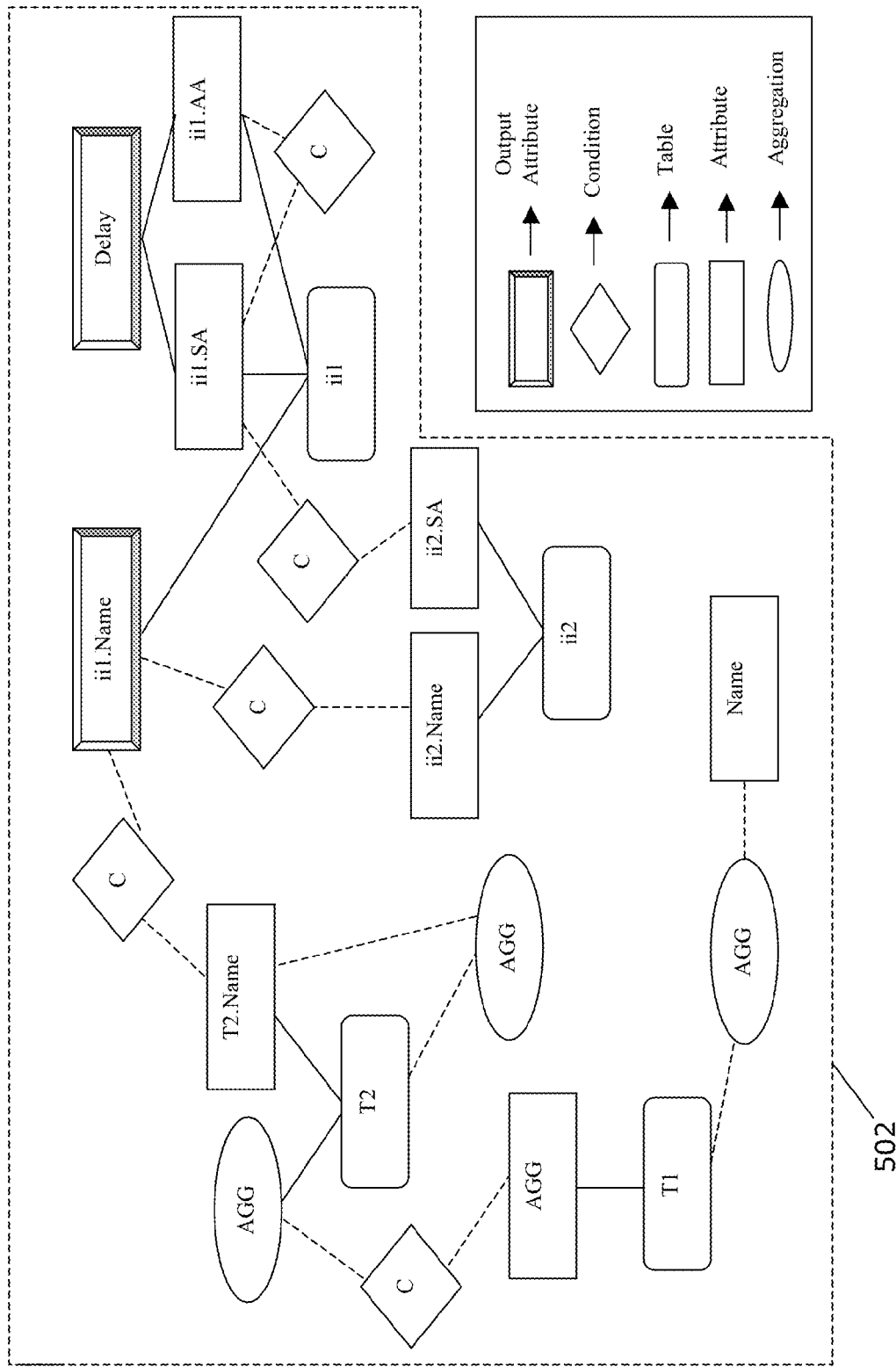
FIG. 5 illustrates a dependency analysis graph for a report.

In accordance with at least one embodiment of the invention, a tool represents a report generation SQL in the form of a Dependency Analysis Graph (DAG). A sample DAG 502, in accordance with the aforementioned illustrative and non-restrictive example, is shown in FIG. 5. The key in FIG. 5 indicates components of: output attributes; conditions; tables; table attributes and aggregations. A DAG represents the transformation that each attribute undergoes before it is eventually used in the report. The DAG aims to capture whether an attribute has undergone any aggregation or not. At the lowest level of the graph are the (source) attributes of the various tables and the highest level of the graph are the outputs/attributes/data which are present in the report. There are multiple paths from the source to the output during which the data undergoes various transformations such as sum, min, count, case statement, etc. Each operation is characterized as either being an aggregate operation or a cardinality preserving operation. The aggregate operation generates one output for multiple rows in the input, where as the cardinality preserving operation generates one row in output for each input row. A tool, in accordance with at least one embodiment of the invention, aims to identify both types of attributes as they both will be part of a fact table. In addition to this, the aggregate attributes are used for dimension identification 404.

The building of a DAG can become very tricky when an attribute is renamed, merged and reused in a different form. The sample graph of FIG. 5 corresponds to a delay report as mentioned further above. In the sample of FIG. 5, it can be noted at first glance that the output attribute ii1.Name appears to be a non aggregate attribute. However, a closer analysis shows that it has a path to an aggregate operator via T2.Name, AGG, T2.

In order to find such paths, a tool in accordance with at least one embodiment of the invention uses three rules for traversing the DAG (of which DAG 502 in FIG. 5 is but a non-restrictive example). In a first rule, a path starting from the output attribute must not traverse through another output attribute. In a second rule, the path should always start from an output attribute and should terminate in a node representing a table. In a third rule, if, for a given output node, there exists at least one path that goes via an aggregate operator, then the node is deemed as an aggregate node. Of course these rules are merely illustrative and may be modified or supplanted by other rules as deemed appropriate.

It is to be noted that the DAG 502 is undirected and has cycles, and this attribute may well be shared by other DAG's employed in accordance with embodiments of the invention. Hence, in accordance with at least one embodiment of the invention an infinite loop is avoided and the tool is configured to find paths efficiently, particularly via employing breadth-first search (BFS). Generally, in the context of embodiments of the invention, BFS can be understood to be a graph search algorithm that begins at a root node and explores all neighboring nodes wherein, for each of the nearest nodes, exploration continues through unexplored neighbor nodes until a goal is reached.

In accordance with at least one embodiment of the invention, the tool uses a BFS based algorithm to start searching from each of the output node. For each of these output nodes, it finds all paths to the base tables such that they adhere to the first rule above. Once these paths are found, all those output attributes which do not have any path traversing through an aggregation operation are either direct or indirect projection attributes. The rest of the attributes are those which either belong to the dimension tables or are used in the where clause of the report generation SQL. Once the direct and indirect projection attributes have been found, the substep of affinity analysis.

Generally, it should be appreciated that multiple fact tables are often needed when developing a data warehouse. This could either happen when the fact tables contain unrelated data (e.g., invoices and sales) or could be done for reasons of efficiency. For example, multiple fact tables are often used to hold various levels of aggregated (summary) data, particularly when the amount of aggregation is large; for example, daily sales, monthly sales, and yearly sales.

In accordance with at least one embodiment of the invention, the affinity analysis substep checks whether there is a need to have multiple fact tables. It first tries to find out whether there is a need for multiple fact tables due to the presence of unrelated data and then tries to find if they are needed due to efficiency issues. In case of the need for multiple fact tables due to unrelated data, it can be appreciated that there will be no (or very few) reports that access data from different fact tables. The tool makes use of this consideration to identify the grouping of attributes discussed above with regard to fact attribute identification. The tool maps the problem to that of finding a minimum cut in a graph as follows.

Let A be the set of attributes identified further above with regard to fact attribute identification. Then, $$A=\{A_1,A_2,\ldots,A_n\}$$

Let R be the set of reports which access these attributes. Then, $$R=\{R_1,R_2,\ldots,R_k\}.$$

Let $A(R_i)$ represent the set of attributes accessed by report $R_i$. Then, $$A(R_i)=\{A_{i1},A_{i2},\ldots,A_{im}|A_{ik}\in A\}$$

Inversely, let $R(A_i)$ give the set of reports, in which attribute $A_i$ is used. This setup is mapped to an undirected graph G.

$$G=\{V,E\} \text{ where}$$

V is the set of vertices in the graph and E is the set of edges.

$$V=\{v_1,v_2,\ldots,v_n|A(v_i)\in A\}$$

Thus in this graph, there is one vertex for each attribute in the schema. The function $A(v_i)$ above takes as input a vertex $v_i$ and gives the attribute of A which is represented by the input vertex. It can be noted that the function A is overloaded and it can take as input either a report or an attribute. If the input is a report then it gives as output the set of attributes accessed by that report whereas if the input is a vertex, then it outputs the attribute which is represented by that vertex.

The set of edges E (in the graph G) is defined as follows:

$$E=\{e_1(v_1',v_1''),e_2(v_2',v_2''),\ldots,e_p(v_p',v_p'')\} \text{ such that,}$$

$$\exists R_i|A(v_i')\in A(R_i)\wedge A(v_i'')\in A(R_i)$$

Figure 6:
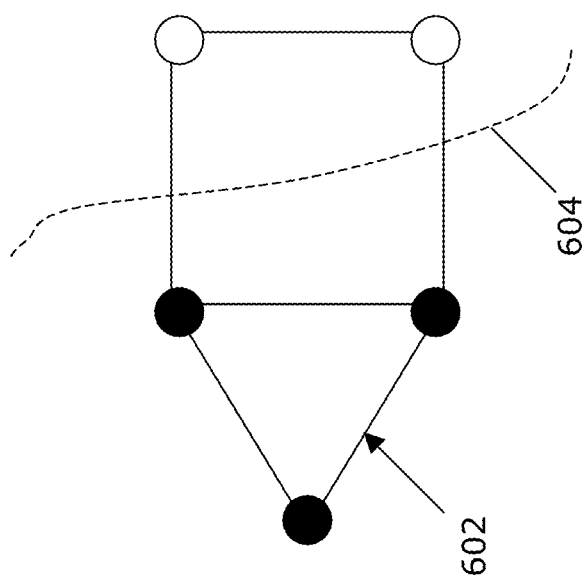
FIG. 6 illustrates a minimum cut of a graph.

Thus, there is an edge between nodes representing two attributes, if both the attributes are accessed by the same report. Thus all the attributes which are accessed in a report will form a strongly connected component in the graph. In other words, if $R_1$ accesses $A_1$, $A_4$, $A_8$ attributes, then there will be following edges in the graph: $(A_1, A_4)$, $(A_1, A_8)$ and $(A_4, A_8)$. In accordance with at least one embodiment of the invention, the tool constructs this undirected graph by adding edges corresponding to all the reports. Given such a graph, if there is a need for multiple fact tables, then it will be appreciated that there will either be two (or more) disconnected components in this graph or the graph could be partitioning into multiple sub-graphs such that the number of edges crossing across each of these sub-graphs is much less (as compared to the number of edges within the sub-graph). This problem maps to that of finding the minimum cut in a graph. The minimum-cut of a graph is the partition of the graph into two disjoint sub-sets such that the number of edges whose end points are in different subsets is the minimum possible. An example of a minimum cut is shown in FIG. 6, where a graph 602 with nodes (the black and white circles) and edges (the lines connecting them) is partitioned with respect to dotted line 604.

This problem can be solved in polynomial time using an algorithm such as the Edmonds-Karp algorithm, as discussed in Jack Edmonds and Richard M. Karp, "Theoretical improvements in algorithmic efficiency for network flow problems," *Journal of the ACM* 19(2): 248-264. In accordance with at least one embodiment of the invention, the tool uses this algorithm to find the minimum cut. Each sub-set identified by the cut can map to an independent fact table. In some cases where no natural cut exists, the algorithm finds a cut whose cut size (i.e., the number of edges whose ends points are in different sub-sets) is very large (as compared to the number of edges in the smaller sub-set). In that case the tool does not suggest the use of multiple fact tables.

Another scenario where, in accordance with at least one embodiment of the invention, the tool can suggest the use of multiple fact tables is when multiple reports aggregate data from the fact table at different levels of aggregation. For example, such a scenario would be present if 50% of the reports are reporting results on a daily basis whereas the rest of the reports are reporting results on a monthly basis. In such a case, the tool suggests the use of two fact tables, one aggregating data on a daily basis, with the other aggregating data on a monthly basis. In order to find the right granularity the tool identifies the aggregation granularity of each report. This is done as a byproduct of the graph analysis discussed hereinabove with regard to fact identification. For each aggregation granularity which is accessed by more than 30% of the reports, the tool suggests the creation of a new fact table. Once the fact identification is done, the next task is that of finding the dimensions of the data model which is explained next with regard to the dimension identification step 404.

In accordance with at least one embodiment of the invention, a dimension identification step 404 is undertaken as follows. Generally, a dimension in a data warehouse is responsible for categorizing the data into non-overlapping regions. In other words, a dimension captures (in a loose sense) the distinct values of some attributes present in the fact table. Hence, the attributes of the dimension table are typically used as a group-by column in the report generation SQL. In accordance with at least one embodiment of the invention, this consideration is used to find the set of attributes that can be part of the dimension table.

In accordance with at least one embodiment of the invention, the procedure of finding the dimension table is divided into two parts: candidate set generation; and hierarchy generation.

In accordance with at least one embodiment of the invention, in the first part (candidate set generation), the tool identifies the set of all attributes which are used in a group by clause of a report generation SQL. It should be noted that finding these attributes is a non-trivial task as the report generation SQL's are fairly complex and large. In accordance with at least one embodiment of the invention, the tool handles all such complexities of SQL and efficiently builds a DAG (as discussed further above), which helps it to find the set of attributes on which group by is defined. These attributes could be anywhere within the SQL such as a nested query, sub-query, etc.

In accordance with at least one embodiment of the invention, the set of attributes identified by the above-described procedure form what can be termed the "candidate attribute set". The set of tables which have at least one of their attributes in the "candidate attribute set" form the "candidate table set". The "candidate table set" is the set of tables which can potentially form a dimension in our a data warehouse schema.

Once the candidate table set has been identified, in accordance with at least one embodiment of the invention, the tool identifies as to whether there is a need to generate the star schema or a snowflake schema using these candidate dimension attributes. (Generally, in the context of embodiments of the invention, a star schema or star join schema may be understood to be embodied by just one or a few fact tables referencing any number of dimension tables. Generally, in the context of embodiments of the invention, a snowflake schema can be understood to be embodied by centralized fact tables connected to multiple dimensions that themselves are normalized into multiple related tables. A star schema can also be considered to be a special case of the snowflake schema.) In accordance with at least one embodiment of the invention, this is done by the second part of dimension identification step 404, namely, hierarchy generation, now to be discussed.

In accordance with at least one embodiment of the invention, in order to identify whether there is need to use a star schema or a snowflake schema, the tool in the hierarchy generation step seeks to find out whether any of the candidate dimension tables can be represented as a hierarchy of multiple tables or need only by represented as a single table. In the event a dimension table can be split into multiple tables then the tool favors the snowflake schema, else the tool favors the star schema. As now to be explained, there are two steps for identifying the presence (or absence) of a hierarchy in the dimension table, in accordance with at least one embodiment of the invention.

When the data warehouse has a hierarchical dimension, the reports which use these dimensions would involve multiple joins across all the dimensions in the hierarchy. In accordance with at least one embodiment of the invention, this tool uses such this information to decide between using a star schema or a snow flake schema as follows. It is to be noted that if a set of attributes are used together in the group by clause, this fact could be exploited to suggest a hierarchical dimension to improve the efficiency of report generation. For example, consider the following report generation SQL:

Select T3.city_id, count(T1.units_sold) from T1, T2 where T1.location_id=T2.location_id and T2.city_id= T3.city_id group by T2.location_id, T3.city_id In the above query the attributes T2.location_id and T3.city_id appear together in a group by clause and they have a join between them. This suggests that T2 and T3 form a hierarchy of dimensions. In case the tables are incorrectly designed, there could be a case where the city and location information is present in a single table. Even in these cases, the tool is able to suggest the use of dimension hierarchy.

In accordance with at least one embodiment of the invention, the tool uses the fact that attributes appearing together in a group by clause could suggest the use of a hierarchy of dimensions. The tool first identifies the set of mutually exclusive super-sets of the candidate attribute set which are used together in the group by clause of the various report generation SQL's. This task can be explained with the following non-restrictive example.

Let the candidate attribute set be: {A, B, C, D, E, F}. Let the attributes {A, B, C}, {B}, {A, B}, {D, E, F} and {D} be each used together in the same group by clause of a report generation SQL, i.e., {A, B, C} is used in one group by clause of a report generation SQL where as {A, B} is used in another group by clause of (possibly) another report generation SQL.

It is to be noted that a single report generation SQL could have multiple group by clauses. In accordance with at least one embodiment of the invention, the tool focuses on those sets of attributes which are used together in the same group by clause. The mutually exclusive super-set, for the above example, will be {A, B, C} and {D, E, F}. The key property of this set is that any member (attribute) of one super set is never used with a member of another super set, i.e., A is never used together with, e.g., D in the same group by clause of a report generation SQL. This property helps in identifying the set of attributes which will be part of the same dimension (or dimension hierarchy).

In accordance with at least one embodiment of the invention, given the mutually exclusive super-set, for each super-set the tool forms the set of tables whose attributes are part of the super-set. As the existing schema in the enterprises are not well defined, the result could be a case where the same table could be part of multiple super set. For example, there could be the following super set for the above scenario, {T1, T2}, {T1, T3, T4} (mapping to {A, B, C} and {D, E, F}). In such a case, the typical reason for this is that the common table (T1) is not in second normal form, i.e., the table T1 has some amount of redundant data. If this redundant data is removed, then overlap can possibly be avoided across the two super sets.

In order to do this, in accordance with at least one embodiment of the invention, the table T1 is converted into second normal form which leads to a split of the table into multiple tables. The tool then reconstitutes the super set of tables and checks if there is any overlap across super sets. In case the overlap still exists, then the same procedure is repeated. This can done for a fixed number of times, e.g., three. If the overlap problem is still not solved, then manual intervention can be employed.

Once the overlap has been removed, in accordance with at least one embodiment of the invention, the tool identifies the dimensions for each of the super set. If the set of tables in the super set already have a primary key-foreign key relationship amongst them, then we use this relationship to form a snowflake schema. (In the context of embodiments of the invention and in relational database design in general, a foreign key can generally be understood to be a referential constraint between two tables while a primary key [or "unique key"] can generally be understood to be a key that uniquely identifies each row in a table.) In case there is no such relationship, the tool checks if each of these tables is in second normal form. If yes, then each of these tables forms a separate dimension as part of a star schema. If a table is found as not being in the second normal form, then the tool converts it to second normal form and repeats the same procedure again.

In accordance with at least one embodiment of the invention, the push-down analysis step 406 is employed to find the right granularity of the fact table. As the schema of the enterprise is not well defined, it could happen that the fact table in the existing data warehouse contains detailed information whereas all the reports could be using data in aggregate format. Hence in such cases the interest of efficiency, it is advantageous that the fact table also contain data in aggregate format.

In accordance with at least one embodiment of the invention, the tool employs the push-down analysis step 406 to identify such anomalies and suggests the right granularity for the fact table. As such, the tool scans the report generation SQL's and identifies whether all the reports are using a common aggregation before generating the reports. In such a case, the tool suggests changing the granularity of the fact table. In order to do so, it suggests the aggregation to be pushed to the ETL scripts used to populate the fact table. It extracts the aggregation operator from the report generation SQL and suggests the same to be used in the ETL scripts. The tool also suggests changes in the report generation SQL due to the change in the fact table. This greatly helps an administrator in quickly generating the necessary ETL scripts for populating the newly defined data warehouse from the base tables.

In accordance with at least one embodiment of the invention, at the end of the push down analysis step 406, the tool has a schema of the new data warehouse including the fact and dimension tables identified in the first three steps (i.e., the steps of fact identification, dimension identification and push-down analysis taken together). In the data analysis step 408, in accordance with at least one embodiment of the invention, the tool ensures that the suggested schema adheres to standard normalization rules. Particularly, the tool checks whether the suggested dimension tables are in second normal form and that the fact table is in third normal form. This ensures that there is no duplication of data in the data warehouse and that the space required for storing the data is minimized. (The concepts of second normal form and third normal form, as referred to herethroughout, are discussed in, and can be further appreciated from, Codd, E. F., "Further Normalization of the Data Base Relational Model." [Presented at Courant Computer Science Symposia Series 6, "Data Base Systems," New York City, May 24-25, 1971.]; republished in Randall J. Rustin (ed.), *Data Base Systems: Courant Computer Science Symposia Series* 6, Prentice-Hall, 1972.)

In accordance with at least one embodiment of the invention, it will be appreciated that a key aspect of a "bottom-up" approach, as can be appreciated to be undertaken in connection with a tool as broadly contemplated herein, is the identification of conformed dimensions. A conformed dimension is a set of data attributes that have been physically implemented in multiple database tables using the same structure, attributes, domain values, definitions and concepts in each implementation. Thus, conformed dimensions define the possible integration "points" between the data marts from different LOB's. Accordingly, in accordance with at least one embodiment of the invention, the redundancy analysis step 410 involves finding candidates for conformed dimension. Here the tool has the advantage of having access to the SQL queries which are used to populate the data in the original data warehouses. The tool make use of these queries to identify the commonalities in the schema across, e.g., departments in an enterprise or large company (and their different applications).

In accordance with at least one embodiment of the invention, the tool creates a data model tree for each attribute of the original schema of the enterprise. The data model tree aims to capture the origins of the attribute, i.e., from where is the data populated in this attribute, what kinds of transformations are applied to the data before it is populated in the attribute, etc. The data model tree is created by analyzing the SQL scripts which populate the attribute. The tool scans the scripts and converts it into a graph similar to the DAG's discussed hereinabove. The only difference is that the DAG's discussed hereinabove are employed to analyze how reports are generated from the existing schema, whereas a data model tree in the redundancy analysis step 410 is used to analyze how existing schema of summary tables is populated from the source tables. Further, there is one graph model per report, where s there is one data model tree per attribute of the original schema.

In accordance with at least one embodiment of the invention, once the data model tree has been generated, the tool finds similar trees by comparing the structure and source of the trees. If two trees are similar, then the tool suggests them as candidates for conformed dimension. Once these candidates have been generated, the tool can then use existing schema matching tools to do further redundancy analysis.

Figure 4:
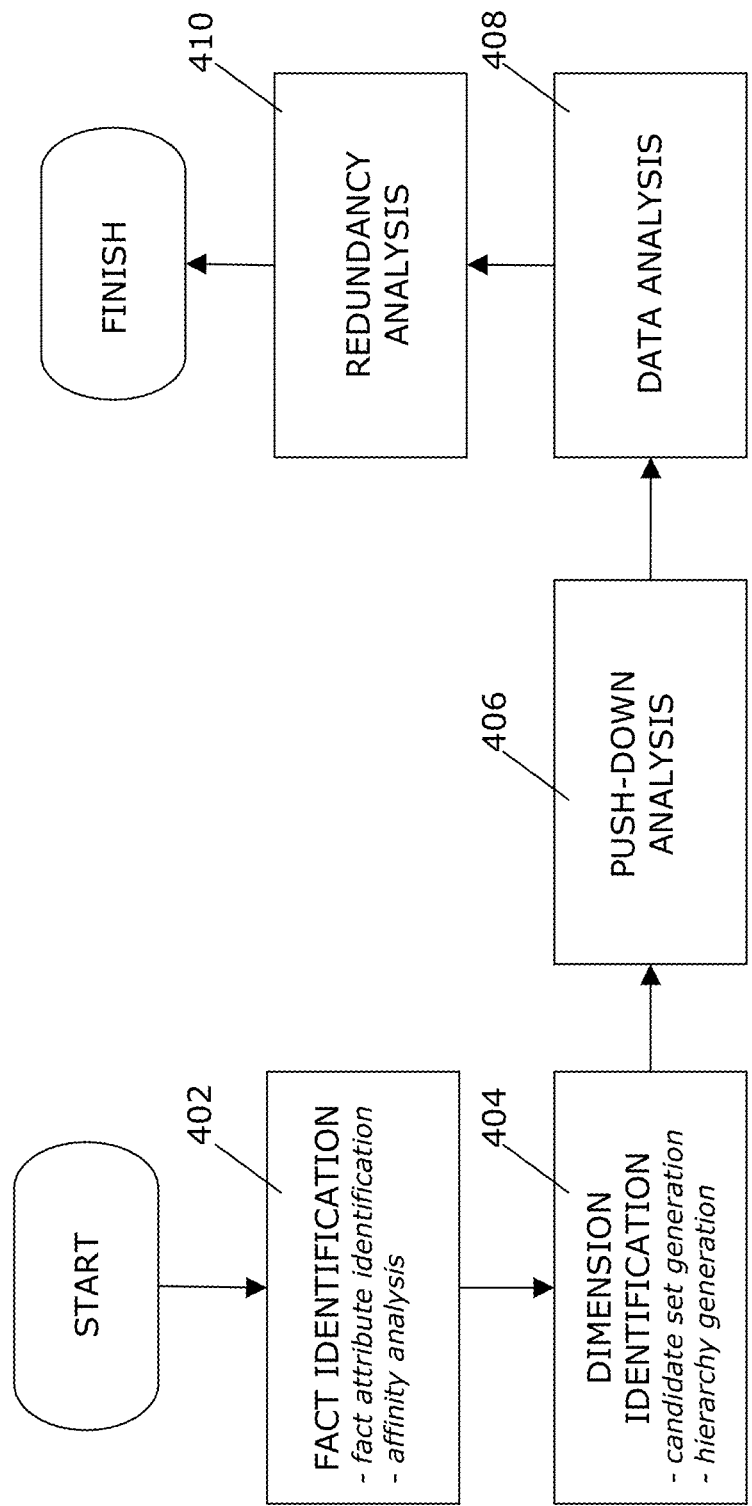
FIG. 4 schematically illustrates a process of finding best possible schema for a data warehouse.

Thus, in accordance with at least one embodiment of the invention, by using the five steps described and illustrated with respect to FIG. 4, the tool finds the new schema for the enterprise. A byproduct of this is the suggestion for writing ETL scripts that can be used to populate data in the new data warehouse.

FIG. 7 sets forth a process more generally for data warehouse data model adaptation. It should be appreciated that a process such as that broadly illustrated in FIG. 7 can be carried out on essentially any suitable computer system or set of computer systems, which may, by way of an illustrative and on-restrictive example, include a system such as that indicated at 12 in FIG. 1. In accordance with an example embodiment, most if not all of the process steps discussed with respect to FIG. 3 can be performed by way a processing unit or units and system memory such as those indicated, respectively, at 16 and 28 in FIG. 1.

As shown in FIG. 7, scripts are assimilated which generate reports, the scripts relating to preexisting base tables (702). A schema is developed for a new data warehouse (704). This developing involves finding base tables to form a fact table in the new data warehouse (706), finding base tables to form dimensions in the new data warehouse (708) and generating scripts for populating the new data warehouse (710).

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising utilizing at least one processor to execute computer code that performs the steps of:
    analyzing base table scripts which generate a plurality of reports from preexisting base tables; and
    developing a schema for a new data warehouse with merged data from the preexisting base tables and the schema configured for singly generating reports relating to the merged data, said developing comprising:
        forming a fact table in the new data warehouse, wherein the forming a fact table comprises identifying a set of fact attributes, from the plurality of reports generated, wherein the set of fact attributes comprises attributes on which an aggregate operation is defined and attributes referenced in at least one of the plurality of reports generated;
        forming dimensions in the new data warehouse, wherein the forming dimensions comprises forming a candidate table set by identifying a set of preexisting base tables which include at least one candidate attribute, wherein the at least one candidate attribute comprises an attribute that is contained within a group-by clause within the plurality of reports; and
        generating warehouse scripts for populating the formed fact table and the formed dimensions for the new data warehouse with data from the preexisting base tables.

2. The method according to claim 1, further comprising ensuring adherence to predetermined design criteria.

3. The method according to claim 1, further comprising merging like attributes from different base tables.

4. The method according to claim 1, wherein said generating comprises referring to base tables.

5. The method according to claim 1, wherein the forming a fact table comprises scanning a report-generating query to identify attributes on which the aggregate operation is defined.

6. The method according to claim 5, wherein said scanning comprises identifying a direct projection attribute and an indirect projection attribute.

7. The method according to claim 5, wherein said scanning comprises employing a dependency analysis graph which represents the report-generating query.

8. The method according to claim 1, wherein the forming a fact table comprises ascertaining a need for multiple fact tables in the new data warehouse.

9. The method according to claim 1, wherein the forming dimensions comprises identifying a set of all attributes which are used in a group-by clause of a report-generating query.

10. The method according to claim 1, wherein the forming dimensions comprises determining candidate dimension tables and ascertaining a potential hierarchy among the candidate dimension tables.

11. The method according to claim 1, wherein said generating comprises determining a granularity for the fact table in the new data warehouse.

12. An apparatus comprising:
    one or more hardware processors; and
    a computer readable storage medium having computer readable program code embodied therewith and executable by the one or more hardware processors, the computer readable program code comprising:
    computer readable program code configured to analyze scripts which generate a plurality of reports from preexisting base tables; and
    computer readable program code configured to develop a schema for a new data warehouse with merged data from the preexisting base tables and the schema configured for singly generating reports relating to the merged data, via:
        forming a fact table in the new data warehouse, wherein the forming a fact table comprises identifying a set of fact attributes, from the plurality of reports generated, wherein the set of fact attributes comprises attributes on which an aggregate operation is defined and attributes referenced in at least one of the plurality of reports generated;
        forming dimensions in the new data warehouse, wherein the forming dimensions comprises forming a candidate table set by identifying a set of preexisting base tables which include at least one candidate attribute, wherein the at least one candidate attribute comprises an attribute that is contained within a group-by clause within the plurality of reports; and
        generating scripts for populating the formed fact table and the formed dimensions for the new data warehouse with data from the preexisting base tables.

13. A computer program product comprising:
    a non-transitory computer readable storage medium having computer readable program code embodied therewith, the computer readable program code comprising:
    computer readable program code configured to analyze scripts which generate a plurality of reports from preexisting base tables; and
    computer readable program code configured to develop a schema for a new data warehouse with merged data from the preexisting base tables and the schema configured for singly generating reports relating to the merged data, via:

forming a fact table in the new data warehouse, wherein the forming a fact table comprises identifying a set of fact attributes, from the plurality of reports generated, wherein the set of fact attributes comprises attributes on which an aggregate operation is defined and attributes referenced in at least one of the plurality of reports generated;

forming dimensions in the new data warehouse, wherein the forming dimensions comprises forming a candidate table set by identifying a set of preexisting base tables which include at least one candidate attribute, wherein the at least one candidate attribute comprises an attribute that is contained within a group-by clause within the plurality of reports; and generating scripts for populating the formed fact table and the formed dimensions for the new data warehouse with data from the preexisting base tables.

14. The computer program product according to claim 13, wherein said computer readable program code is further configured to ensure adherence to predetermined design criteria.

15. The computer program product according to claim 13, wherein said computer readable program code is further configured to merge like attributes from different base tables.

16. The computer program product according to claim 13, wherein said computer readable program code is configured to refer to base tables in generating scripts for populating the new data warehouse.

17. The computer program product according to claim 13, wherein said computer readable program code is configured to scan a report-generating query to identify attributes on which the aggregate operation is defined.

18. The computer program product according to claim 17, wherein said computer readable program code is configured to identify a direct projection attribute and an indirect projection attribute.

19. The computer program product according to claim 17, wherein said computer readable program code is configured to employ a dependency analysis graph which represents the report-generating query.

20. The computer program product according to claim 13, wherein said computer readable program code is configured to ascertain a need for multiple fact tables in the new data warehouse.

21. The computer program product according to claim 13, wherein said computer readable program code is configured to identify a set of all attributes which are used in a group-by clause of a report-generating query.

22. The computer program product according to claim 13, wherein said computer readable program code is configured to determine candidate dimension tables and ascertain a potential hierarchy among the candidate dimension tables.

23. The computer program product according to claim 13, wherein said computer readable program code is configured to determine a granularity for the fact table in the new data warehouse.

* * * * *